(12) United States Patent
Hoffmann et al.

(10) Patent No.: US 7,984,792 B2
(45) Date of Patent: Jul. 26, 2011

(54) LUBRICATION SYSTEM

(75) Inventors: Timothy Andrew Hoffmann, Greenwood, IN (US); Dan Vetters, Indianapolis, IN (US); Matthew Michael Miller, Indianapolis, IN (US); Phillip Howard Burnside, Avon, IN (US); Didier Leveille, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 446 days.

(21) Appl. No.: 12/173,427

(22) Filed: Jul. 15, 2008

(65) Prior Publication Data
US 2009/0218170 A1 Sep. 3, 2009

Related U.S. Application Data

(63) Continuation-in-part of application No. 12/041,034, filed on Mar. 3, 2008.

(51) Int. Cl.
*F01M 9/00* (2006.01)
*F01M 5/00* (2006.01)
(52) U.S. Cl. ..................... 184/6.22; 184/6.26
(58) Field of Classification Search .................. 184/6.4, 184/6.11, 6.22, 6.26
See application file for complete search history.

(56) References Cited

U.S. PATENT DOCUMENTS

| | | | |
|---|---|---|---|
| 2,447,671 A | 11/1945 | Schuck | |
| 3,939,944 A | 2/1976 | Mitchell et al. | |
| 4,284,174 A * | 8/1981 | Salvana et al. | 184/6.4 |
| 4,343,378 A | 8/1982 | Bremer | |
| 4,785,913 A | 11/1988 | Maurer et al. | |
| 4,915,194 A | 4/1990 | Englander et al. | |
| 5,020,636 A * | 6/1991 | Daeges | 184/6.26 |
| 5,097,926 A | 3/1992 | Duello | |
| 5,163,757 A | 11/1992 | Graham | |
| 5,351,786 A | 10/1994 | Graham et al. | |
| 5,498,352 A | 3/1996 | Graham et al. | |
| 5,498,354 A | 3/1996 | Graham et al. | |
| 5,636,708 A | 6/1997 | Wedeven et al. | |
| 6,050,756 A | 4/2000 | Buchholz et al. | |
| 6,145,626 A | 11/2000 | Niemczura, Sr. et al. | |
| 6,290,024 B1 * | 9/2001 | Ehlert | 184/6.26 |
| 6,622,942 B2 | 9/2003 | Ueno et al. | |
| 6,640,933 B2 | 11/2003 | Henry et al. | |
| 7,117,976 B2 | 10/2006 | Rowe et al. | |
| 7,174,997 B2 | 2/2007 | Sheridan | |
| 2003/0000773 A1 * | 1/2003 | Engler et al. | 184/6.26 |
| 2007/0177835 A1 | 8/2007 | Verhaegen | |

OTHER PUBLICATIONS

Wilson, D.R., Effect of Extreme Conditions On The Behavior of Lubricants & Fluids, Tech. Report AFML-TR-67-8, Part III, Feb. 1969, pp. II-X & 1-93, Wright-Patterson AFB, OH.
Van Treuren, K. W. et al., Investigation of Vapor-Phase Lubrication in a Gas Turbine Engine, Journal of Eng. for Gas Turbines & Power, Apr. 1998, vol. 120, pp. 257-262, Orlando.

* cited by examiner

*Primary Examiner* — Michael R Mansen
*Assistant Examiner* — Robert T Reese
(74) *Attorney, Agent, or Firm* — Krieg DeVault LLP

(57) ABSTRACT

A lubrication system for a component is disclosed herein. The disclosed lubrication system can be applied relatively high temperature operating environments, relatively low temperature operating environments, or both. The lubrication system includes a tank operable to contain lubricant and having at least one tank outlet. The lubrication system also includes a tube extending between first and second ends. The first end of the tube is in fluid communication with at least one tank outlet. The lubrication system also includes an atomizer in fluid communication with the second end of the tube to receive lubricant from the tank. The atomizer is operable to dispense atomized lubricant on the component. The tank, the tube, and the atomizer are all adjacent to the component. A method for practicing the invention is also disclosed.

17 Claims, 3 Drawing Sheets

LUBRICATION SYSTEM

CROSS-REFERENCE TO RELATED APPLICATIONS

This application is a continuation-in-part of U.S. application Ser. No. 12/041,034 for a VAPOR PHASE LUBRICATION SYSTEM, filed on Mar. 3, 2008, which is hereby incorporated by reference in its entirety.

STATEMENT REGARDING FEDERALLY SPONSORED RESEARCH OR DEVELOPMENT

The present invention was made under U.S. Government Contract Number N00014-04-D-0068 awarded by the Department of Defense, and the Department of Defense may have certain rights in the present invention.

BACKGROUND OF THE INVENTION

1. Field of the Invention

The invention relates to a lubrication system for a component and more particularly to a system for delivering atomized lubricant to a rotating component.

2. Description of Related Prior Art

Lubrication systems supply lubricant to bearings, gears and other components that require lubrication. The lubricant cools the components and protects them from wear. Some operating environments pose severe challenges to successfully lubricating the component. For example, conditions such as relatively high temperatures or relatively low temperatures can adversely the effect the tribological properties of the lubricant. For example, relatively high operating temperatures can break down the lubricant. Low temperatures on the other hand can cause the viscosity of the lubricant to increase, making it more difficult to move the lubricant from a storage tank to the component.

SUMMARY OF THE INVENTION

In summary, the invention is a lubrication system for a component that can be subjected to relatively high temperatures, relatively low temperatures, or both. The lubrication system includes a tank operable to contain lubricant and having at least one tank outlet. The lubrication system also includes a tube extending between first and second ends. The first end of the tube is in fluid communication with at least one tank outlet. The lubrication system also includes an atomizer in fluid communication with the second end of the tube to receive lubricant from the tank. The atomizer is operable to dispense atomized lubricant on the component. The tank, the tube, and the atomizer are all adjacent to the component. A method for practicing the invention is also disclosed.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF AN EXEMPLARY EMBODIMENT

In the exemplary embodiment, the invention can be applied to the relatively extreme operating environment defined by a turbine engine powering an missile carried by an aircraft. However, the invention can be practiced in other operating environments. Prior to firing, a missile carried by an aircraft can be bathed in air at 0° F. or less for extended periods of time. Subsequent to firing, portions of the turbine engine can reach temperatures of 900° F. before the end of the mission. Thus, components of the turbine engine can be exposed to opposite temperature extremes, each temperature extreme individually posing challenges to successfully lubricating components of the missile. The term "mission" is used since the exemplary embodiment of the invention can be a missle; other terms such as "operation" or "operating cycle" can be applied in alternative embodiments of the invention.

The exemplary embodiment of the invention provides a lubrication system that can effectively lubricate one or more components of the turbine engine over substantially the entire operating temperature range. Both the arrangement of the components of the system and the performance characteristics of the lubricant enhance the performance of the lubrication system. With respect to arrangement, the components of the system can all be disposed adjacent to the component to be lubricated. As a result, the distance that the lubricant travels is minimized and the potential for heat transfer relative to the lubricant (both heat absorption and heat loss) is reduced. Heat absorption by the lubricant can be undesirable because it can be difficult to control the size of the lubricant droplets when the lubricant is at a relatively high temperature during atomization. To atomize is to reduce a quantity of liquid into fine particles or spray. With respect to performance characteristics, the lubricant of the exemplary embodiment of the invention can lubricate as both a liquid and as a solid. Film lubricants are solid materials that provide low frictional resistance between surfaces when applied directly to interacting surfaces. Solid film lubricants can vary widely in terms of chemical composition.

Figure 1:
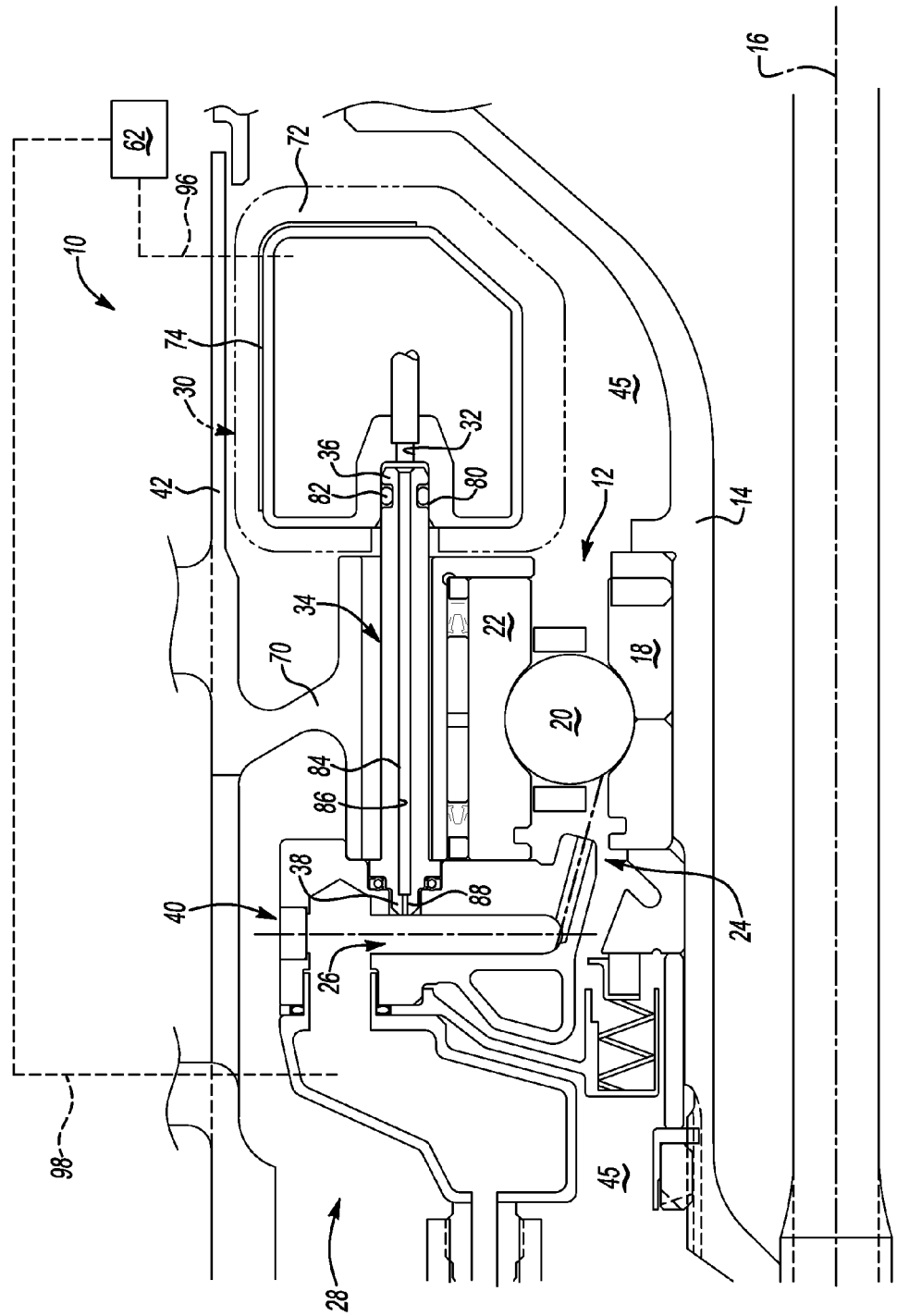
FIG. 1 is a cross-section of a relevant portion of a turbine engine showing the exemplary embodiment of the invention.

FIG. 1 shows a cross-section of a portion of a turbine engine 10. A bearing 12 can be positioned to support a shaft 14 rotating about a centerline axis 16. The bearing 12 can support the shaft 14 radially and also bear axial loads. The bearing 12 can include an inner race 18, a roller element 20, and an outer race 22. The inner race 18 can rotate about the centerline axis 16 with the shaft 14 and the outer race can be substantially stationary. In the exemplary embodiment of the invention, the bearing 12 can operate over a temperature range of between about 0° F. or less to about 900° F. before the end of the mission.

In the exemplary embodiment of the invention, it can be desirable to use Durad™ as lubricant for the bearing 12. When the bearing 12 is at a temperature of between about 0° F. or less to about 400° F., Durad™ can function as a typical "oil" or liquid film lubricant to provide effective lubrication. When the bearing 12 is at temperature between about 600° F. to about 900° F., Durad™ will change phase upon contact with the bearing 12, allowing it to react with the bearing race material creating a solid film that provides effective lubrication. In between those ranges, at temperatures of between about 400° F. to about 600° F., the effectiveness of Durad™ as a liquid film lubricant can be somewhat compromised and, also, Durad™ will not change phase, which will not allow it to react with the bearing race material to form a solid film. Since the effectiveness of the lubricant may be reduced over this temperature range, heat can build-up quickly and cause the bearing 12 to heat to 600° F. from 400° F. in a relatively brief period of time. Therefore, the period of reduced lubricant effectiveness can be minimized. It is noted that other lubricants that behave in a similar manner can be used in alternative embodiments of the invention.

Lubricant can be injected to the bearing 12 through a nozzle 24. As shown in FIG. 1, the nozzle 24 can be disposed radially-between the inner and outer races 18, 22 of the bearing 12 relative to the axis 16 and can also be overlapping with the inner and outer races 18, 22 along the axis 16. It can be desirable to atomize the lubricant and direct a mist of lubricant droplets at the bearing 12 rather than spray a steady stream of lubricant at the bearing 12 for at least two reasons. First, the amount of lubricant used during the mission can be minimized. Second, reducing the amount of lubricant applied to the bearing 12 can obviate the need for a scavenging system.

However, lubricating the bearing 12 with atomized lubricant can require delivering the lubricant droplets through air turbulence. Air flows can be generated around the bearing 12 as a result of the rotation of the inner race 18. Generally, these flows can be "windage" wherein the air is urged in the direction of rotation. In a simplified arrangement in which the rotating component is cylindrical or ring-like and the surrounding static structure is also ring-like, the windage can define a relatively predictable velocity profile with the highest velocity air flow being adjacent to the rotating component and the lowest velocity air flow being adjacent to the static structure. However, turbulence can upset the predictable velocity profile. Turbulence is the haphazard or irregular secondary motion caused by eddies within a moving fluid. Turbulence can be generated by discontinuities in the surfaces guiding air flow, such as corners, edges or other structures projecting into the flow path. Turbulence can also be generated by voids or pockets where one or more of the surfaces guiding air flow drops away from the flow path.

A field of turbulence can arise between the bearing 12 and the nozzle 24 since various structures can be positioned in close proximity to the bearing 12, disrupting the flow of windage. The field of turbulence around the bearing 12 can block lubricant from reaching the bearing. For example, the field of turbulence can cause relatively smaller droplets of lubricant to deflect away from the bearing 12. These "small" lubricant droplets may therefore not collide with the roller element 20 and the inner race 18. Therefore, it can be desirable to atomize the lubricant into droplets of sufficient size such that the droplets have sufficient mass and momentum upon exiting the nozzle 24 to pass through the turbulence generated by the bearing 12.

The size of the lubricant droplets can be substantially controlled by the configuration of an atomizing nozzle, at least initially. The exemplary embodiment of the invention includes an atomizing nozzle 26 that is distinct from the nozzle 24 and this atomizing nozzle 26 will be described in greater detail below. However, it is noted that the size of the lubricant droplets can change downstream of the atomizing nozzle 26. For example, if the atomized lubricant absorbs heat during passage to the bearing 12, the individual, relatively larger droplets can sub-divide into a greater number of smaller droplets. As set forth above, smaller droplets can be more vulnerable to deflection by turbulence. Therefore, it can be desirable to minimize the transfer of heat to the atomized lubricant during passage to the bearing 12. The temperature of the lubricant upstream of the atomizing nozzle 26 can be controlled to be within a desired temperature range, such as 180° F.-400° F. to promote larger lubricant droplets.

The exemplary embodiment of the invention provides a lubrication system 28 for the bearing 12. The lubrication system 28 includes a tank 30 operable to contain lubricant and having at least one tank outlet 32. The lubrication system 28 also includes a tube 34 extending between first and second ends 36, 38. The first end 36 of the tube 34 is in fluid communication with the tank outlet 32. The lubrication system 28 also includes an atomizer 40 in fluid communication with the second end 38 of the tube 34 to receive lubricant from the tank 30. The atomizer 40 is operable to dispense atomized lubricant on the bearing 12.

The tank 30, the tube 34, and the atomizer 40 are all adjacent to the bearing 12 in the exemplary embodiment of the invention. As shown in FIG. 1, the components of the exemplary lubrication system 28 partially encircle the bearing 12. As shown in FIG. 1, the tube 34 is thinner than the tank 30 and the atomizer 40 in a radial direction relative to the centerline axis 16. As also shown in FIG. 1, the tank 30 is disposed on a first axial side of the bearing 12. The atomizer 40 receives fluid from the tube 34 on a second axial side of the bearing 12 opposite the first axial side. The tube 34 overlaps the bearing 12 along the axis 16. FIG. 1 also shows that at least a portion of the tank 30 and at least a portion of the atomizer 40 are disposed radially inward of a radially outermost portion or edge of the bearing 12 relative to the axis 16. A sump housing 42 defining a sump cavity 45 can at least partially enclose the tank 30, the tube 34, the atomizer 40, and the bearing 12. The proximity between the components of the lubrication system 28 and the bearing 12 substantially minimizes the distance that the lubricant travels and thereby substantially minimizes the transfer of heat to the lubricant during passage from the tank 30 to the bearing 12 or vice versa when the system is below a desired temperature.

Figure 2:
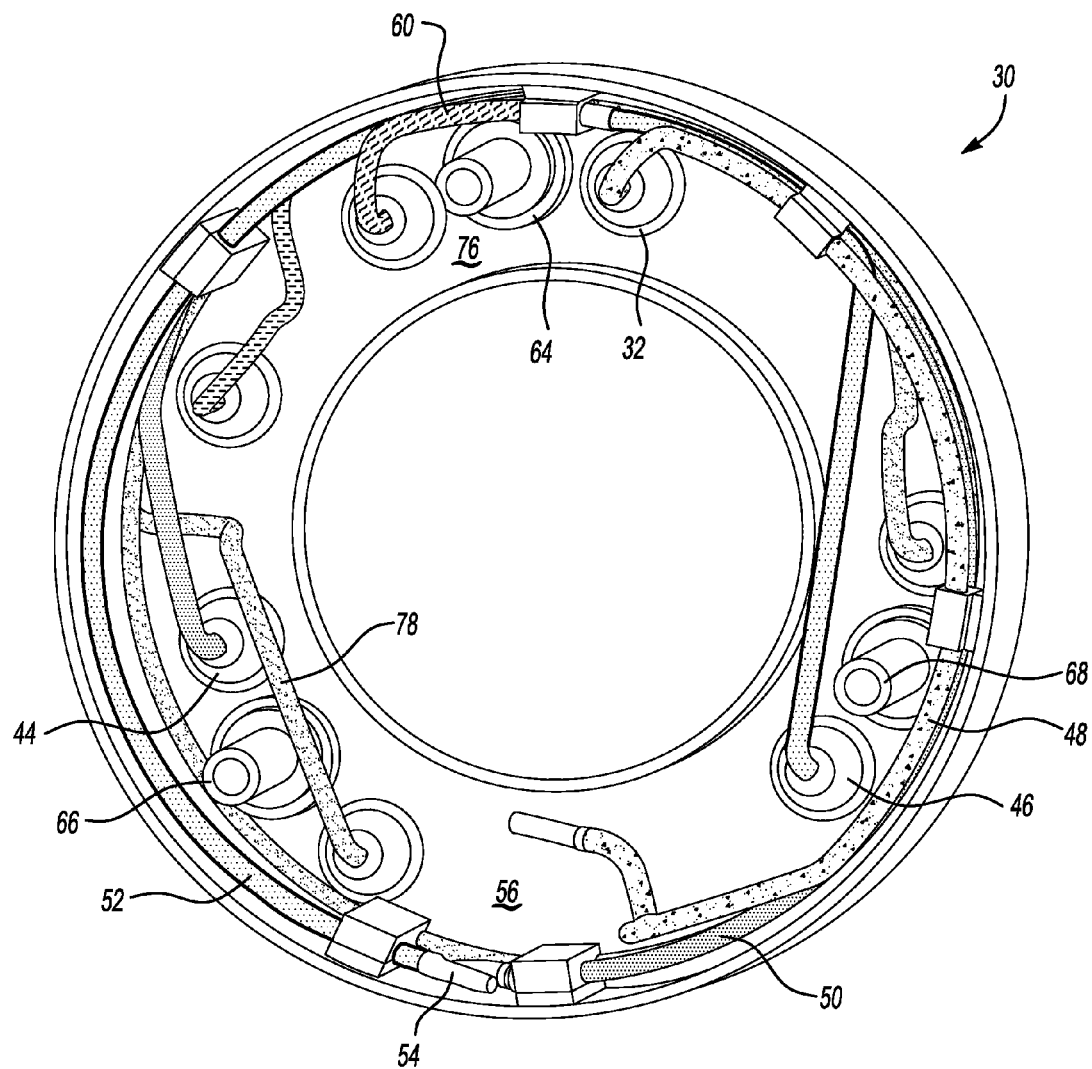
FIG. 2 is a perspective view of an interior of a lubricant tank according to the exemplary embodiment of the invention.

Referring now to FIG. 2, the exemplary tank 30 can include a plurality of tank outlets 44, 46 in addition to the tank outlet 32. The tank 30 can include any number of tank outlets in alternative embodiments of the invention. Such embodiments can include a corresponding number of tubes 34.

The exemplary tank 30 can also include a plurality of conduits 48, 50, 52 internal to the tank 30 for directing lubricant out of the tank 30. In the exemplary embodiment of the invention, the conduit 48 can be substantially shorter than the conduits 50 and 52 to facilitate priming of the system 28. Each of the conduits 48, 50, 52 can extend from an individual conduit inlet to one of the tank outlets 32, 44, 46. For example, the conduit 52 extends from a conduit inlet 54 to the tank outlet 46. A screen can cover each of the conduit inlets to prevent particles from potentially clogging the system 28.

The inlets of the conduits 48, 50, 52 can be disposed at bottom 56 of the tank 30. A baffle 58 can be disposed in the tank 30, extending above the conduit inlets. The baffle 58 can capture lubricant if the orientation of the tank 30 becomes inverted during operation to ensure that the conduit inlets can draw lubricant. The end of conduit 48 is also bent up into the baffle 58 to ensure it always remains submerged within lubricant in the exemplary embodiment of the invention.

In the exemplary embodiment of the invention, all of the conduits 48, 50, 52 extend from the bottom 56 of the tank 30 to a top 76 of the tank 30, and then extend further, away from the top 76 towards the bottom 56 to one of the respective tank outlets 32, 44, 46. This arrangement prevents seepage and leakage of the lubricant out of the tank 30 due to the lubricant height in the tank being above the tank outlet. Without the extra loop in each tube 48, 50, 52 extending above the free surface of the lubricant, the lubricant would flow out of the tank 30 due to this difference in height in the exemplary embodiment of the invention.

The tank 30 can also include a conduit 60 operable to receive fluid for pressurizing the tank 30. The fluid for pressurizing the tank 30 can be drawn from any source. By way of example and not limitation, the fluid can be drawn from a compressor section 62 (shown in FIG. 1) of the turbine engine 10. U.S. application Ser. No. 12/041,034 for a VAPOR PHASE LUBRICATION SYSTEM, filed on Mar. 3, 2008, discloses additional structures for directing pressurized fluid to the tank 30 and is incorporated by reference in its entirety. The tank 30 can also include a conduit 78 operable to receive fluid cooling the tank 30. The fluid for cooling the tank 30 can be drawn from any source, including ambient air. The conduit 78 can also be used to directed fluid through the tank 30 for heating the lubricant. For example, a bleed from the compressor section 62 of the turbine engine can be at a desirable temperature for heating the lubricant, especially at the beginning of the mission in the exemplary embodiment of the invention.

Referring to FIG. 1, the tank 30 is covered with a layer 72 of insulation and also includes a heater 74. The heater 74 can be operated to keep the lubricant at a desired temperature prior to operation. It has been found that the lubricant will flow well at 180° F., however the lubricant can be maintained at other temperatures in alternative embodiments of the invention. The layer 72 of insulation can be useful throughout operation, to prevent heat from being drawn away from the lubricant prior to operation and to prevent heat from being absorbed by the lubricant over the course of operation.

FIG. 2 also shows three mounting structures 64, 66, 68 for mounting the tank 30 to a frame 70 (shown in FIG. 1). The number of mounts for connecting the tank 30 to some other structure can be minimized to reduce potential paths of conductive heat transfer. Also, washers made from insulating material such as ceramics can be disposed between the tank 30 and mounting bolts to further reduce conductive heat transfer.

Referring again to FIG. 1, the first end 36 of the tube 34 can be slidably received in a counter-bore 80 defined at the tank outlet 32. An o-ring 82 can be positioned to seal the tube 34 and the tank 30 relative to one another. The o-ring 82 can be disposed between the first end 36 and the counter-bore 80. The first end 36 and the counter-bore 80 can contact one another on both axial sides of the o-ring 36 along the axis 16. The contact area between the first end 36 and the counter-bore 80 can be maximized in order to maximize the conductive transfer of heat. In other words, the heater 74 can heat the tube 34 as well as the tank 30. It can be desirable to maintain the tube 34 and the tank 30 at the same temperature in order to prevent heat transfer, gain or loss, to the lubricant.

The tube 34 can be formed from aluminum to counteract potential heat transfer. Aluminum has a relatively high specific heat and will therefore be relatively more resistant to temperature change. Also, aluminum has a relatively high thermal conductivity and will therefore distribute thermal energy more evenly. The tube 34 can be formed from different materials in alternative embodiments of the invention, including Inconel™. The tube 34 can be formed with a wall thickness much greater than would be required based on the fluid pressure of the lubricant in order for the tube 34 to be more resistant to temperature change. The view of the tube 34 in FIG. 1 can be to scale relative to the other structures shown in the drawing and thereby show an exemplary wall thickness. The maximized wall thickness of the tube 34 can also be desirable to fortify the strength of the system 28 in that the tube 34 will be able to bear any loads imparted due to misalignment of the atomizer 40 and the tank 30.

The tube 34 can define a stepped bore 84 with a first portion 86 of greater diameter adjacent to the first end 36 and a second portion 88 of lesser diameter adjacent to the second end 38. The diameter of the first portion 86 can be maximized in order to minimize the pressure drop of lubricant passing through the bore 84. The second portion 88 is part of the atomizing nozzle 26. In the exemplary embodiment of the invention, the diameter of the second portion 88 can be from about twenty-thousandths of an inch to about thirty-thousandths of an inch in order to generate lubricant droplets of desired size. However, the diameter of the second portion 88 can be different in alternative embodiments of the invention.

Figure 3:
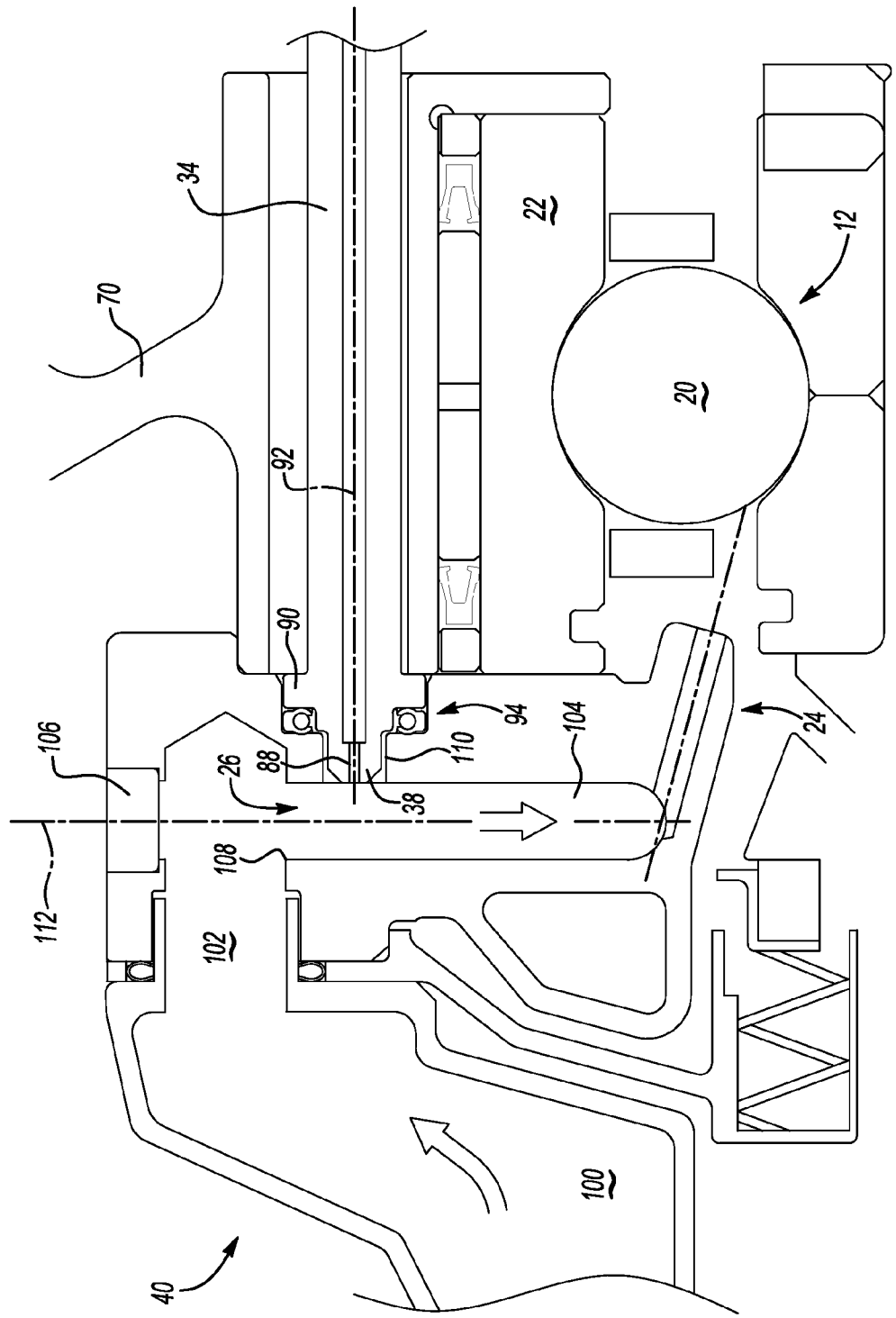
FIG. 3 is a magnified portion of FIG. 1.

Referring now to FIG. 3, the tube 34 can extend at least partially around the bearing 12 to the second end 38. The atomizer 40 can be positioned adjacent to the bearing 12 opposite the lubricant tank 30 (shown in FIG. 1) and communicate with the second end 38 of the tube 34 to receive lubricant. The tube 34 can include a flange 90 that extends radially outward relative to a longitudinal axis 92 of the tube 34. The flange 90 and a face seal 94 can be captured between the frame 70 and the atomizer 40.

The contact area between the atomizer 40 and the tube 34 can be minimized to minimize conductive heat transfer. Also, the face seal 94 can be designed and/or formed from a material to thermally insulate the tube 34 and the atomizer 40 from one another. As set forth above, the atomizer 40 and other components can be at a temperature that is undesirably low at the beginning of operation. Referring again to FIG. 1, as set forth above, the tank 30 can be heated by the heater 74 to keep the lubricant at a desired temperature and the tube 34 can receive thermal energy from the tank 30 since the lubricant will contact the tube 34. However, it can be desirable to minimize the burden on the heater 74. As will be set forth in greater detail below, the lubricant may not contact the surfaces of the atomizer 40 and therefore heating of the atomizer 40 may not be necessary.

The arrangement of the components of the exemplary lubrication system 28 minimizes the total distance lubricant must travel to reach the bearing 12. In addition, the arrangement minimizes the distance that the lubricant must travel after being atomized by the atomizing nozzle 26. As a result, the potential for heat transfer to the lubricant is minimized. Also, the likelihood that lubricant droplets of sufficient size will reach the bearing 12 is increased.

In the operation of the exemplary embodiment of the invention, the atomizer 40 and the tank 30 can communicate with a source of pressurized fluid. The source can be the compressor section 62 and the fluid can be air. However, other sources and other types of fluid can be applied in alternative embodiments of the invention. A first conduit 96 can communicate pressurized fluid to the tank 30 and a second conduit 96 communicate pressurized fluid to the atomizer 40. The conduits 96, 98 are illustrated schematically; the pressurized fluid can be directed differently in alternative embodiments, including directing the pressurized fluid for the tank 30 through the atomizer 40. As set forth above, U.S. application Ser. No. 12/041,034 is incorporated by reference and discloses a system for delivering pressurized fluid.

Referring now to FIG. 3, within the atomizer 40, the pressurized fluid can enter a receiving chamber 100, pass through an in intermediate chamber 102, and enter a mixing chamber 104 to reach the atomizing nozzle 26. The receiving chamber 100 can communicate with a plurality of different intermediate chambers 102 disposed about the centerline axis 16 (shown in FIG. 1) to direct pressurized fluid to a plurality of atomizing nozzles 26. The intermediate chamber 102 can be designed in order to promote the uniform flow of fluid in the mixing chamber 104. For example, the intermediate chamber 102 can be sized larger than the mixing chamber 104. Also, the intermediate chamber 102 can extend past an entrance 108 into the mixing chamber 104. These two features allow the intermediate chamber 102 to act as a plenum relative to the mixing chamber 104 and promote uniform flow in the mixing chamber 104, especially across the atomizing nozzle 26. It is noted that the structure 106 is a cap to the intermediate chamber 102 and not an aperture leading out of the intermediate chamber 102. In the exemplary embodiment of the invention, the cap 106 is added to the atomizer 40 after the mixing chamber 104 has been machined. Alternatively, other manufacturing processes can be used in practicing the invention such that machining the mixing chamber 104 is not required.

Pressurized fluid can enter the mixing chamber 104 through the first entrance 108. Lubricant can enter the mixing chamber 104 through the atomizing nozzle 26 which is received in a second entrance 110. As shown in FIG. 3, the second end 38 of the tube 34 extends through the second entrance 110 defined by the atomizer 40 and an annular gap is defined between the second end 38 and the entrance 110 to thermally isolate the second end 38 and the entrance 110 from one another. The entrances 108, 110 can be spaced from one another a maximum distance along a central axis 112 of the mixing chamber 104 to promote uniform flow at the entrance 110. The axes 92 and 112 can be transverse to one another, perpendicular or less than perpendicular. As can be seen in FIGS. 1 and 3, the exemplary axis 112 can be normal to the axis 16 in order to minimize the distance of travel of the lubricant droplets. The flow of pressurized fluid across the atomizing nozzle 26 produces a venturi effect drawing lubricant out of the tube 34. The tank 30 and the mixing chamber 104 can be pressurized with the same source and therefore the total, respective pressures in the tank 30 and in the mixing chamber 104 are equal. However, because the static pressure in front of the atomizing nozzle 26 is lower than the total pressure in the tank 30, lubricant is drawn from the tube 34.

Based on the size of the second portion 88 and the pressure differential, lubricant can be atomized into droplets of between about five thousandths of an inch in diameter to about ten thousandths of an inch in diameter. The droplets of lubricant entrained in the pressurized fluid can pass through the mixing chamber 104 to the nozzle 24. Some lubricant may contact the surface defining the mixing chamber 104; however, this contact can be negligible. The mixing chamber 104 can include a hemispherical end adjacent to the entrance of the nozzle 24. The hemispherical end prevents the lubricant that does contact the surface of the mixing chamber 104 from collecting. The hemispherical shape defines a surface that guides lubricant back into the flow of pressurized fluid. This will result in the lubricant being re-entrained in the pressurized fluid. The radius of the hemispherical end can be equal to the radius of the mixing chamber 104 so that the flow path of the lubricant does not define any "hard" changes in direction. A hemispherical end designed otherwise would result in a relatively abrupt shoulder.

As demonstrated above, the exemplary lubrication system 28 can be fully passive in that merely a bleed off the compressor section 62 of the turbine engine 10 can cause the lubrication system 28 to operate. In the words, the exemplary lubrication system 28 can be fully passive since the compressor section 62 will be operating anyway during the mission. The exemplary lubrication system 28 does not require a dedicated pump and the weight, cost, and space associated therewith. However, a pump could be added if so desired in alternative embodiments of the invention. In addition, the exemplary lubrication system 28 minimizes the distance traveled by the lubricant and also includes several features for controlling temperature. These features for controlling temperature are targeted rather than applied system-wide in order to minimize the cost and complexity of the system. For example, the exemplary heater 74 is applied to heat only the tank 30 and the tube 34, not the atomizer 40. It is noted however, that a heater could be applied to the atomizer in alternative embodiments of the invention.

The exemplary embodiment discloses a bearing 12 as the component to be lubricated. However, a different type of component can be lubricated in alternative embodiments of the invention. The broader invention can be applied to lubricate other components such as gears, cams, cam followers, or any other structure to be lubricated. The method and apparatus can be applied to, or incorporated in, a turbine engine. The method and apparatus can also be applied to any machine having components to be lubricated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus comprising:
   a component to be lubricated and operable to at least partially rotate about an axis;
   a tank operable to contain lubricant and having at least one tank outlet;
   a tube extending between first and second ends wherein said first end is in fluid communication with said at least one tank outlet; and
   an atomizer in fluid communication with said second end of said tube to receive lubricant from said tank and operable to dispense atomized lubricant on said component, wherein said tank, said tube, and said atomizer are all adjacent to said component, and wherein said tank, said tube, and said atomizer are further defined as substantially immediately adjacent to and partially surrounding a radially outer portion of said component such that said tank is disposed on a first axial side of said component, said atomizer receives fluid from said tube on a second axial side of said component opposite said first axial side, and said tube overlaps said component along said axis.

2. The apparatus of claim 1 further comprising:
   a heater operably positioned to heat lubricant disposed in said tank.

3. The apparatus of claim 1 further comprising:
   an insulating layer at least partially covering said tank.

4. The apparatus of claim 1 further comprising:
   at least one conduit internal to said tank and having a conduit inlet positioned at a bottom of said tank and a conduit outlet in fluid communication with said tank outlet, wherein said at least one conduit extends from said conduit inlet substantially to a top of said tank and further extends away from said top towards a bottom of said tank to said conduit outlet.

5. The apparatus of claim 1 further comprising:
a plurality of conduits internal to said tank for directing lubricant out of said tank, wherein one of said conduits is substantially shorter than the remaining conduits.

6. The apparatus of claim 1 wherein said first end of said tube is slidably received in a counter-bore defined at said tank outlet, wherein an o-ring is disposed between said first end and said counter-bore, said first end and said counter-bore contacting one another on both axial sides of said o-ring along said axis.

7. The apparatus of claim 1 wherein an interior surface of said tube defines a stepped bore with a first portion of greater diameter adjacent to said first end and a second portion of lesser diameter adjacent to said second end.

8. The apparatus of claim 1 further comprising:
a face seal operably positioned between said tube and said atomizer at said second end.

9. The apparatus of claim 1 wherein said atomizer further comprises:
a mixing chamber in fluid communication with said second end of said tube and extending along a first axis transverse to a centerline axis of said tube such that a flow of fluid through said mixing chambers produces a venturi effect and draws lubricant out of said tube, wherein said first axis is normal to said axis about which said component is operable to rotate.

10. The apparatus of claim 1 wherein at least a portion of said tank and at least a portion of said atomizer are disposed radially inward of a radially outermost portion of said component relative to said axis.

11. The apparatus of claim 1 wherein said component is further defined as a bearing having an inner race, an outer race, and at least one roller element and wherein said atomizer includes a nozzle through which lubricant droplet are emitted, said nozzle disposed radially-between said inner and outer races relative to said axis and also overlapping said inner and outer races along said axis.

12. The apparatus of claim 1 wherein said second end of said tube extends through an entrance defined by said atomizer, an annular gap defined between said second end and said entrance to thermally isolate said second end and said entrance from one another.

13. A method for delivering lubricant to a component comprising the steps of:
selecting a lubricant operable to lubricate in liquid form over a first temperature range and to lubricate as a solid film over a second temperature range higher than the first temperature range;
operating a component such that the component reaches both first and second ranges of temperature; and
delivering the lubricant to the component in liquid form during said operating step, whereby the temperature of the component dictates the form of the lubricant, said delivering step including the steps of:
disposing the lubricant tank on a first axial side of the component; disposing the atomizer on a second axial side of the component opposite the first axial side; directing the lubricant from the lubricant tank to the atomizer through a tube extending across the component between the first and second axial sides;
generating a stream of fluid in an atomizer from a source of pressurized fluid; and
placing the source of pressurized fluid in communication with an interior of the lubricant tank.

14. The method of claim 13 further comprising the step of:
drawing lubricant out of the lubricant tank and into the atomizer at least in part by venturi effect.

15. The method of claim 13 wherein said delivery step is further defined as:
delivering lubricant to the component in particles sized from about five thousandths of one inch in diameter to about ten thousandths of one inch in diameter.

16. The method of claim 13 further comprising the steps of:
maintaining the tube and the lubricant tank at substantially the same temperature; and
at least partially insulating the tube from the atomizer.

17. A turbine engine comprising:
a bearing disposed for rotation about a centerline axis and having an inner race and an outer race and at least one roller element;
a sump housing at least partially enclosing said bearing;
a lubricant tank positioned in said sump housing disposed on a first axial side of said bearing along said centerline axis and having at least one tank outlet;
a tube extending at least partially around a radially-outer edge of said outer race of said bearing between a first end in fluid communication with said tank outlet and a second end spaced from said first end, said tube being thinner than said tank in a radial direction relative to said centerline axis;
an atomizer positioned disposed on a second axial side of said bearing opposite to said first axial side and communicating with said second end of said tube to receive lubricant from said tank, said atomizer operable to direct atomized lubricant to said bearing, said tube being thinner than said atomizer in a radial direction relative to said centerline axis;
a compressor section;
a first conduit communicating the pressurized fluid to said tank; and
a second conduit extending between said compressor section and said atomizer to communicate pressurized fluid to said atomizer, wherein said atomizer directs a stream of the pressurized fluid across said second end to produce a venturi effect drawing lubricant out of said tube.

* * * * *